P. MÜLLER.
SHAPING MACHINE FOR THE HANDLES OF CANES.
APPLICATION FILED APR. 13, 1910.
1,058,888.
Patented Apr. 15, 1913.
3 SHEETS—SHEET 1.
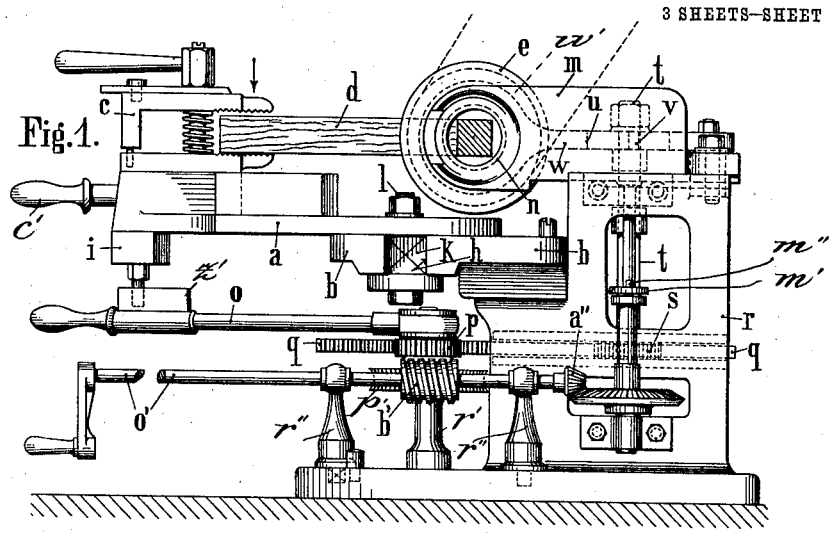
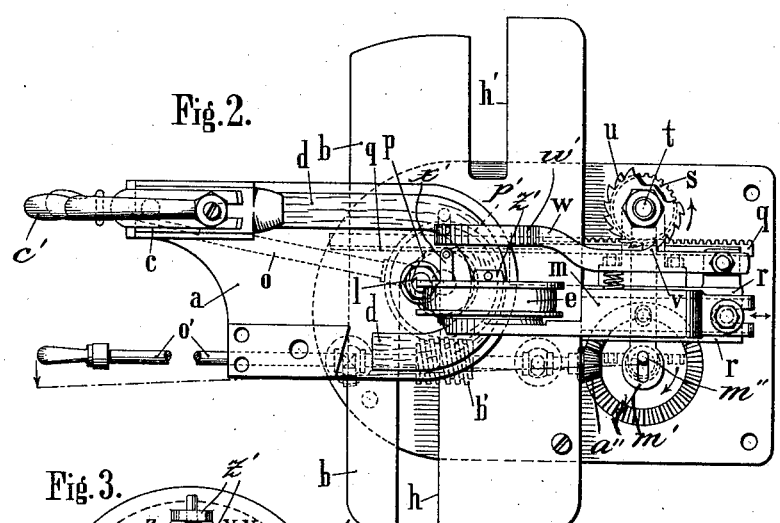
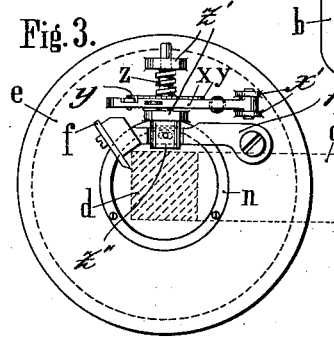
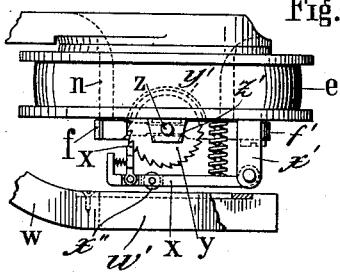
Witnesses
E. Schallinger
R. Isenstein
Inventor
Paul Müller
by B. Singer
Atty P. MÜLLER.
SHAPING MACHINE FOR THE HANDLES OF CANES.
APPLICATION FILED APR. 13, 1910.

1,058,888.

Patented Apr. 15, 1913.
3 SHEETS—SHEET 2.

Witnesses:
M. Hefling
Everett Lancaster

Inventor
Paul Müller
By B. Singer
Attorney

P. MÜLLER.
SHAPING MACHINE FOR THE HANDLES OF CANES.
APPLICATION FILED APR. 13, 1910.

1,058,888.

Patented Apr. 15, 1913.

3 SHEETS—SHEET 3.

Witnesses:
C. H. Crawford
Ger. C. Heinicke

Inventor
Paul Müller
By B. Singer
Attorney.

UNITED STATES PATENT OFFICE.

PAUL MÜLLER, OF RIXDORF, NEAR BERLIN, GERMANY.

SHAPING-MACHINE FOR THE HANDLES OF CANES.

1,058,888.  Specification of Letters Patent.  Patented Apr. 15, 1913.

Application filed April 13, 1910. Serial No. 555,273.

*To all whom it may concern:*

Be it known that I, PAUL MÜLLER, a subject of the Empire of Germany, residing at Rixdorf, near Berlin, Germany, have invented certain new and useful Improvements in Shaping-Machines for the Handles of Canes, of which the following is a specification.

My present invention relates to shaping machines for the handles of canes, umbrellas, parasols and the like, the machine being adapted to complete the handle from the rough to its desired shape and section, and in readiness for such finish as is desired to impart thereto.

The objects of my invention are to provide a machine, simple in construction and positive in action, and one which may impart the following enumerated sections or configurations to the handle: 1. A handle of circular cross section uniform throughout its length. 2. A handle of circular cross section diminishing in diameter throughout its length whereby a tapering handle is produced. 3. A handle circular in cross section with rings or corrugations about the same.

Figure 5:
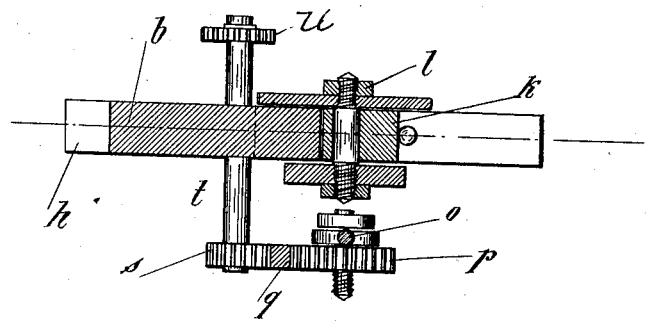
Figure 6:
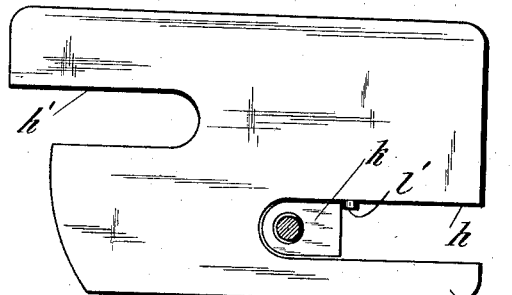
Figure 7:
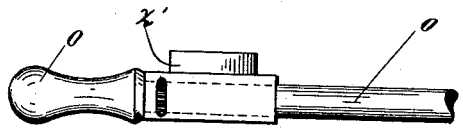
Figure 8:
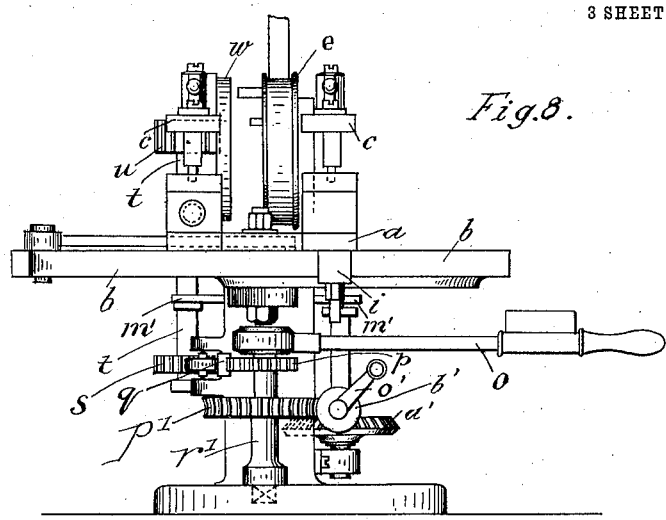
Figure 9:
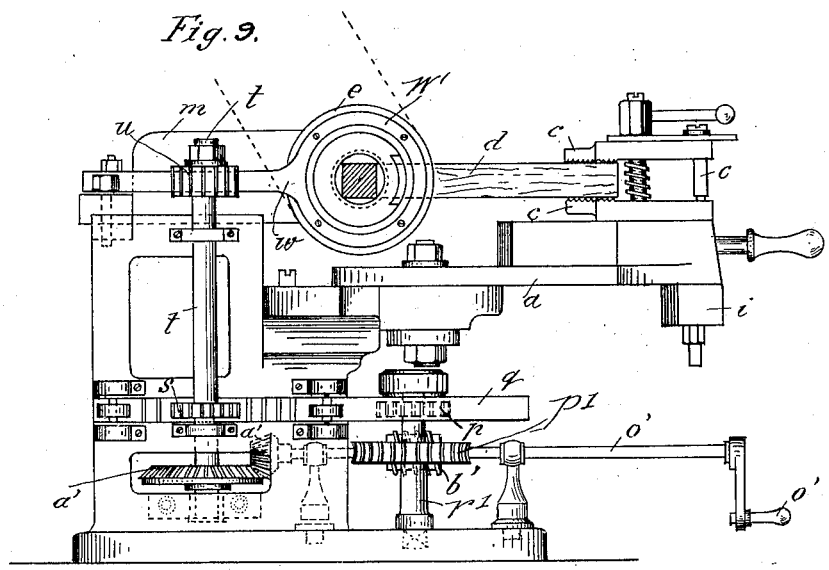

In the drawings, forming a part of this specification:—Figure 1 is a side elevation of a machine embodying my invention. Fig. 2 is a plan view of the same, the details shown in Figs. 3 and 4 being omitted. Fig. 3 is a detail view in end elevation showing the cutting mechanism. Fig. 4 is a plan view showing in detail parts of the cutting mechanism. Fig. 5 is a sectional view taken longitudinally of a guide table used in connection with the device. Fig. 6 is a plan view of the guide table showing pivotal means for the work carriage. Fig. 7 is a detail view of one of the operating levers. Fig. 8 is an end elevation looking toward the right of Fig. 1. Fig. 9 is a side elevation of the device complementary to that shown in Fig. 1.

Similar characters refer to similar parts throughout the several views.

Generally speaking, the device includes a machine frame $r$ adapted to be mounted upon a suitable foundation; a work carriage $a$; a guide table $b$; a cutter carriage $m$, and suitable mechanism, associated therewith and for operation thereof, to be subsequently described in detail.

The guide table $b$ is carried by the machine frame $r$, and is provided with parallel slots $h$ and $h'$ extending from the opposite margin of the table inwardly toward the center of the machine. This table supports and guides the work carriage in such a manner that the latter may be oscillated or moved in a line guided by the before mentioned slots $h$ and $h'$.

The work carriage is provided with a bearing block $k$ which fits into the slot $h$ and may be retained at the inner end thereof in any well known manner. Such block $k$ receives a pin $l$ suitably secured to the carriage $a$ whereby the same may swing with respect to the bearing $k$. The carriage $a$ is further provided with a clamping device $c$, which may be of any suitable design, for securing the handle $d$, to be worked thereto, and a suitable guide stop $i$, the utility of which will be subsequently described. A handle $c'$ may also be provided to facilitate the positioning of the carriage $a$.

From the foregoing it is made obvious that the carriage $a$ may be swung or oscillated about its bearings $k$, or may be swung to such a position that the guide stop $i$ may enter the slot $h'$ and the carriage be moved in a straight line under control of the slots $h$ and $h'$.

The cutter carriage $m$ is slidably mounted upon the frame $r$ to move to and from the pivotal axis of the work carriage $a$, and is provided with a bearing ring $n$ upon which a cutter wheel $e$ is revolubly mounted. The cutter wheel $e$ is so positioned with its plane of rotation cross wise the direction of feed of the handle $d$ which passes therethrough. The cutter wheel $e$ carries a knife $f$, which, for the purpose of changing its position with respect to the center of the wheel, is pivotally mounted thereto through an arm $f'$.

The position of the knife $f$ is under the control of a screw $z$, movable longitudinally in bearings $z'$ carried by the wheel $e$, and pivotally connected, as at $z''$ to the arm $f'$, a disk-shaped feed nut $y$, having a toothed periphery, being in coaction with said screw and confined to circumferential movement by being partly engaged in a recess $y'$ formed in the wheel $e$. Thus, by rotating the nut $y$, the screw $z$ is moved axially and the knife $f$ displaced through the connection of the screw with the arm $f'$. In order to enable this adjustment of the knife to take place during operation of the cutting mechanism, to produce a tapering handle, or to adjust the knife by means disposed in close proximity to the operator of the machine when the same is inactive, the following mechanism is provided:—Upon the frame $r$ is mounted a standard $r'$ which carries a rotatable pinion $p$, actuated by the lever $o$, the pinion meshing with a double rack $q$ slidably carried by the frame $r$. The standard $r'$ also carries a worm wheel $p'$ rotatable with the wheel $p$, the purpose of which to be subsequently described. The rack $q$ meshes with a rotatably mounted pinion $s$, which, through its spindle $t$, carries with it, upon rotation, a ratchet wheel $u$. This wheel $u$ acts upon a pawl $v$ of a spring actuated lever $w$, such lever being provided with an annular portion $w'$ which is positioned in spaced relation with the cutter wheel $e$ and in a corresponding position with respect to the disposition of their planes. It will readily be seen that, by movement of the lever $o$, oscillatory movement may be imparted to the lever $w$ through the herein before described coacting parts. This oscillatory movement of the lever $w$ transmits movement to the feed nut $y$ by its portion $w'$ coming in contact with suitable pawl mechanism $x$ clearly disclosed in Figs. 3 and 4, which mechanism is pivoted to the wheel $e$ by a pair of lugs $x'$ and acts upon the nut $y$ to rotate the same. Since the pawl mechanism $x$ rotates with the cutting mechanism when such is operating, a roller $x''$ is provided for the latter which contacts with the annular portion $w'$ of the lever $w$ when the latter is oscillated.

The lever $o$ is provided with an off set portion $z'$ which may be positioned in contact with the guide stop $i$ and the work carriage $a$ swung around its pivot and the knife $f$ of the cutting mechanism gradually fed inward to produce a tapering handle, or the off set portion $z'$ may be moved out of the path of the stop $i$, the knife $f$ adjusted to produce a handle of the desired diameter through the lever $o$, and the carriage $a$ operated, independently of the lever $o$, through handle $c'$ whereby a handle of uniform diameter is produced.

The cutter carriage $m$ is moved to and fro by means of a rocker arm $m'$ which may be pivoted about the spindle $t$ and receives its motion through a crank pin $m''$ carried by a beveled wheel $a'$. Movement is imparted to the beveled wheel $a'$ by a coacting gear $a''$ carried by the crank shaft $o'$, the shaft $o'$ being carried by standards $r''$.

As shown in Figs. 1 and 2 the standards $r''$ are displaceable in the direction of the arrows shown at the left of Fig. 2, whereby the axis of the shaft $o'$ may be moved to coincide with the "dot and dash" line shown in connection with the arrow. The shaft $o'$ carries a worm $b'$ for coaction with the before mentioned worm wheel $p'$ and when the shaft $o'$ is in the position shown in full lines, such member $b'$ and $p'$ are in engagement, however, when the shaft is swung as before mentioned, the worm is no longer in engagement with worm wheel $p'$, and therefore, rotation of the shaft $o'$ only effects the cutter carriage by moving it to and fro. With the shaft $o'$ in the latter position the mechanism may be operated alternately with the turning of the work around the bolt $l$ to produce a handle of substantially uniform diameter provided with annular corrugations at certain intervals by continuously feeding the handle through swinging the carriage $a$ and by continuously rotating the shaft $o'$ whereby the knife is moved to and from the center of the handle $d$ responsive to the movement of the carrier $m$.

When the worm $b'$ is engaged with the worm wheel $p'$ the handle produced will be of diminishing diameter and provided with a spiral groove all of which is accomplished by rotating the shaft $o'$ and feeding the handle $d$ as previously described.

It is of course, to be understood that in feeding the handle $d$, when the curved portion is finished, the straight portion thereof is worked by positioning the guide pin $i$ in the slot $h'$ and moving the carriage $a$ in a straight line.

I claim:—

1. A machine for shaping canes comprising in combination, a supporting frame, a work carriage mounted thereon, a slidably mounted bar provided with an opening for passage of the canes, a belt pulley rotatably mounted on said bar and provided with a knife for cutting the canes, means carried by the pulley for adjusting the knife, an oscillating lever operating said means, a work carriage shifting handle, and mechanism operatively connected with said shifting handle for oscillating said lever.

2. A machine for shaping canes comprising in combination, a supporting frame, a work carriage movably mounted on said frame, a reciprocating bar provided with an opening for passage of the canes, means for reciprocating said bar, a belt pulley mounted on said bar and provided with a knife for cutting the canes, means carried by said pulley for adjusting the knife, an oscillating lever for operating said means, and provided with a ratchet tooth, a work carriage shifting handle, a ratchet wheel engaging said tooth to oscillate said lever, and gearing operatively connecting said ratchet wheel and said shifting handle.

3. A shaping machine for canes comprising in combination, means for feeding the work, a slidably mounted carriage, a cutter carrier revoluble about work and carried by said carriage, a knife carried by said cutter carrier, mechanism for altering the position of said knife with respect to said cutter carrier for varying the cut thereof, and means for simultaneously operating said mechanism for altering the position of said knife and for imparting a to and fro movement to said carriage.

4. A shaping machine for canes comprising in combination, means for feeding the work, a slidably mounted carriage, a cutter carrier revoluble about the work and carried by said carriage, a knife carried by said cutter carrier, mechanism for altering the position of said knife with respect to said cutter carrier for varying the cut thereof, and means for imparting a to and fro movement to said carrier.

5. In a shaping machine for canes, the combination with suitable frame work, of a cutter carrier revoluble about the work, a lever pivoted thereto, a knife carried by said lever, a screw pivoted to said lever and carried by said carrier to oscillate the same, a nut confined against axial displacement for imparting movement to said screw, a second lever pivoted to said frame work, means for oscillating said second mentioned lever, and means imparting movement of said second mentioned lever to said nut for rotating the same to alter the position of said knife.

6. In a shaping machine for canes, the combination with suitable frame work, a cutter carrier revoluble about the work, an arm pivoted thereto, a knife carried by said arm, a screw pivoted to said arm and carried by said carrier to oscillate the same, a nut confined against axial displacement for imparting movement to said screw, a lever pivoted to said frame work, means for oscillating said lever, and pawl mechanism interposed between said lever and nut for rotating the same to alter the position of said knife.

In witness whereof I have hereunto set my hand in presence of two witnesses.

PAUL MÜLLER.

Witnesses:
 WOLDEMAR HAUPT,
 HENRY HASPER.

Copies of this patent may be obtained for five cents each, by addressing the "Commissioner of Patents, Washington, D. C."